United States Patent [19]

Kobayashi et al.

[11] Patent Number: 5,296,650
[45] Date of Patent: Mar. 22, 1994

[54] METHOD FOR WATERPROOFING WITH A CROSS-LINKED MACROMOLECULAR WATERPROOFING AGENT

[75] Inventors: Hiroya Kobayashi; Tadao Shimomura; Kazuhiro Okamura, all of Osaka; Yoshinori Sano, Hyogo, all of Japan

[73] Assignee: Nippon Shokubai Kagaku Kogyko Co., Ltd., Osaka, Japan

[21] Appl. No.: 984,500

[22] Filed: Dec. 2, 1992

Related U.S. Application Data

[62] Division of Ser. No. 716,628, Jun. 17, 1991, Pat. No. 5,190,815, which is a division of Ser. No. 318,067, Jan. 27, 1989, abandoned.

[30] Foreign Application Priority Data

Jun. 9, 1987 [JP] Japan ................... 62-142186
Jul. 7, 1987 [JP] Japan ................... 62-167692
Nov. 16, 1987 [JP] Japan ................... 62-287366

[51] Int. Cl.$^5$ ........................... H02G 15/00
[52] U.S. Cl. ................... 174/23 C; 385/100; 428/375
[58] Field of Search ............ 174/23 R, 23 C; 385/100; 428/375, 378, 387, 377

[56] References Cited

U.S. PATENT DOCUMENTS 5,133,034 7/1992 Arroyo ................ 174/23 C

Primary Examiner—Christopher Henderson
Attorney, Agent, or Firm—Omri M. Behr; Matthew J. McDonald

[57] ABSTRACT

A waterproofing agent for an optical or electric cable, formed of a cross-linked macromolecular compound containing a sulfonic acid group or a salt thereof in an amount of not less than 0.5 mg. equivalent/g and a dissociating group in an amount of not less than 1.0 mg. equivalent/g, and a method for waterproofing said cable by packing said waterproofing agent in the sheath of said cables.

11 Claims, No Drawings

METHOD FOR WATERPROOFING WITH A CROSS-LINKED MACROMOLECULAR WATERPROOFING AGENT

This application is a division, of application Ser. No. 07/716,628, filed Jun. 17, 1991 which is a divisional of Ser. No. 07/318,067, filed Jan. 27, 1989, issued as U.S. Pat. No. 5,190,815, abandoned.

DESCRIPTION

1. Technical Field

This invention relates to a waterproofing agent for cables such as communication cables and electric cables typified by optical cables and metallic cables and to a method for waterproofing such cables with the waterproofing agent. More particularly, it relates to a waterproofing agent for preventing highly concentrated salt water like sea-water from seeping in beneath the sheaths of optical and metallic cables, moving inside the sheaths, and eventually deteriorating various devices to which the cables are connected and to a method for waterproofing the cables with the waterproofing agent.

2. Background Art

The cables like optical cables and metallic cables used as communication cables and electric power cables are generally produced by wrapping one or more optical fibers or electroconductive metallic wires with insulating paper or some other similar insulator and further covering the outer surface of the insulator with a sheath of synthetic resin or metal. If such a cable sustains an external injury in the sheath thereof and suffers water to seep into the sheath, the disadvantage ensues that the cable itself or various devices to which the cable is connected are deteriorated. For the purpose of overcoming the disadvantages, the method has been proposed which comprises filling the interior of the sheath with a water absorbent resin capable of being swelled with absorbed water and consequently obstructing further movement of water within the sheath (Japanese Patent Laid-Open SHO 56(1981)-93,210, Japanese Patent Laid-Open SHO 59(1984)-17,508, U.S. Pat. No. 4,308,416, and EP-A-0 24 631).

As absorbent resins fit for this method, cross-linked polysodium acrylate, neutralized starch-acrylic acid graft polymer, saponified vinyl acetate-acrylic ester copolymer, and neutralized cross-linked isobutylene-maleic anhydride copolymer, for example, have been used.

These conventional absorbent resins, however, have their capacity for absorption degraded irreversibly on contact with such polyvalent metallic ions as calcium and magnesium. If the interior of the sheath is permeated with sea water or if it is soaked for a long time in subterranean water containing calcium ion in a low concentration, the absorbent resins eventually cease to manifest the waterproofing effect.

The absorbent acrylic fibers formed of hydrolyzed acrylonitrile (co)polymer [Japanese Patent Laid-Open SHO 57(1982)-82,567 and Japanese Patent Laid-Open SHO 55(1980)-98,915] and acrylonitrile-acrylic acid copolymer [Japanese Patent Laid-Open SHO 61(1986)-239,034] have been developed and have found utility in sealing materials.

These absorbent fibers have the disadvantage that they offer poor resistance to salts and, therefore, fail to manifest the ability of absorption fully on contact with aqueous liquids containing a polyvalent metallic ion and suffer from gradual loss of the ability of absorption with the elapse of time. When they are used as a waterproofing agent, their effects in water-proofing a cable hardly deserve high praise.

As means for preventing water from seeping into the sheath of a cable or into various devices to which the cable is connected with such absorbent resins or absorbent fibers as mentioned above, the method which comprises in directly packing the absorbent resins or absrobent fibers in the sheath of the cable and the method which effects incorporation of a powdery absorbent resin in the sheath of a cable by depositing the powdery absorbent resin fast on a film or sheet with an organic high molecular binder thereby preparing a waterproofing tape and winding this waterproofing tape around metallic wires or optical fibers to be wrapped in the sheath of the cable have been heretofore adopted. Particularly, the method which uses the absorbent resin as fabricated in the form of a waterproofing tape has been finding growing utility in recent years because it is capable of efficiently waterproofing cables.

Since the binder which is used in the fabrication of the waterproofing tape for use in the method is apt to obstruct the ability of the absorbent resin to swell with absorbed water and, consequently, the waterproofing tape's speed of swelling with an aqueous liquid is low, the waterproofing tape will require a very long time in completely absorbing the aqueous liquid seeping into the sheath of the cable and will suffer the seeping aqueous liquid to continue its advance over a long distance possibility enough to approach the metallic wires or optical fibers or the various devices to which the cable is connected.

An object of this invention, therefore, is to provide a waterproofing agent for cables such as communication cables and electric power cables containing optical fibers and metallic wires in proper sheaths, which waterproofing agent excels in resistance to salts and manifests the waterproofing effect stably for a long time without sacrificing the ability of water absorption upon contact with highly concentrated salt water which happens to seep into the sheath of the cable and a method for waterproofing such cables as mentioned above with the waterproofing agent.

Another object of this invention is to provide a waterproofing material in the form of sheet or tape even in the case of seeping an aqueous liquid in the sheath of the cables, which material absorbs the liquid rapidly to prevent the liquid seeping into a neighborhood of optical fibers or metallic cables or into various devices to which the cables are connected, and a method for waterproofing with such waterproofing material.

DISCLOSURE OF THE INVENTION

The object described above are accomplished by a waterproofing agent for cables, which waterproofing agent comprises a cross-linked macromolecular compound containing a sulfonic acid group or a salt thereof in an amount of not less than 0.5 mg equivalent/g and a dissociating group in an amount of not less than 1.0 mg equivalent/g.

The object are further accomplished by a method for waterproofing a cable containing metallic wires or optical fibers in a sheath, which method is characterized by packing the interior of the sheath with at least one waterproofing material selected from the group consisting of a cross-linked macromolecular compound containing a sulfonic acid group or a salt thereof in an amount of not less than 0.5 mg equivalent/g and a dissociating group in an amount of not less than 1.0 mg equivalent/g, fibers having the cross-linked macromolecular compound immobilized on a fibrous substance, and a waterproofing tape obtained by immobilizing the cross-linked macromolecular compound on the surface of film or sheet through the medium of an organic polymeric binder.

Best Mode for Carrying Out the Invention

Examples of the sulfonic acid group or a salt thereof to be contained in the cross-linked macromolecular compound for use in the present invention include sulfonic acid groups, alkali metal salts such as sodium salts and potassium salts, alkaline earth metal salts such as magnesium salts, and metal salts such as zinc salts respectively of sulfonic acid groups, ammonium salts of sulfonic acid groups, and organic amine salts of sulfonic acid groups.

Examples of the dissociating group to be contained in the cross-linked macromolecular compound for use in the present invention include anionically dissociating groups such as sulfonic acid groups, carboxylic acid groups, and metal salts, ammonium salts, and organic amine salts thereof and cationically dissociating groups such as amines and quaternary ammonium salts.

The cross-linked macromolecular compound to be used in this invention is required to containing a sulfonic acid group or a salt thereof in an amount of not less than 0.5 mg equivalent/g. and a dissociating group in an amount of not less than 1.0 mg equivalent/g. Preferably, the content of the sulfonic acid group or a salt thereof is in the range of 0.5 to 8.0 mg equivalent/g. particularly 1.0 to 6.0 mg equivalent/g., and that of the dissociating group in the range of 1.0 to 13 mg equivalent/g., particularly 2.0 to 10 mg equivalent/g. If the content of the dissociating group is less than 1.0 mg equivalent/g., the cross-linked macromolecular compound's ability for water absorption is not sufficient for the waterproofing effect to be manifested. If the content of the sulfonic acid group or a salt thereof is less than 0.5 mg equivalent/g., the cross-linked macromolecular compound is so susceptible to the influence of a polyvalent metal salt that the stable waterproofing effect will not be retained for a long time.

The cross-linked macromolecular compound to be used in the present invention is desired to be capable of absorbing deionized water in a total amount not less than 5 times the own weight. Preferably the capacity for water absorption is in the range of 50 to 1,000 times, particularly 100 to 600 times, the own weight If this capacity is less than 5 times the own weights, the waterproofing agent has difficulty in retaining a sufficient waterproofing effect for a long time.

The term "cross-linked macromolecular compound's ability for water absorption" as used in the present invention refers to the weight of a swelled gel obtained by keeping the compound immersed for one hour in a large volume of deionized water and, at the end of the immersion, separating the swelled compound from the deionized water to the weight of the same compound before the immersion.

The cross-linked macromolecular compound which is useful advantageously as the waterproofing agent of this invention for cables can be produced for example, by (1) a method which comprises polymerizing (A) a sulfonic acid group-containing unsaturated monomer, when necessary, in the presence of (C) a cross-linking agent, (2) a method which comprises copolymerizing (A) a sulfonic acid group-containing unsaturated monomer and (B) other polymerizable monomer, when necessary, in the presence of (C) a cross-linking agent, (3) a method which comprises polymerizing (B) a polymerizable monomer, when necessary, in the presence of (C) a cross-linking agent and sulfonating the resultant cross-linked polymer with a sulfonating agent such as sulfuric acid, sulfuric anhydride, 1,3-propane sultone, 1,4-butane sultone, or (sodium salt of) hydroxyalkanesulfonic acid, or (4) a method which comprises polymerizing (B) a polymerizable monomer and causing the resultant polymer to react with (C) a cross-linking agent and, at the same time, sulfonating the polymer with a sulfonating agent.

Examples of the sulfonic acid group-containing unsaturated monomer (A) which is usable in the production of the cross-linked macromolecular compound of this invention include unsaturated sulfonic acids and sodium, potassium, and other alkali metal salts, calcium, magnesium, and other alkaline earth metal salts, zinc and other similar metal salts, ammonium salts, and organic amine salts thereof, specifically vinyl sulfonic acids, allyl sulfonic acids, methallyl sulfonic acids, styrene sulfonic acids, 2-acrylamide-2-methylpropanesulfonic acid, 3-allyloxy-2-hydroxypropanesulfonic acid, 2-sulfoethyl(meth)acrylates, 3-sulfopropyl(meth)acrylates, 1-sulfopropan-2-yl(meth)acrylates, 2-sulfopropyl(meth)acrylates, 1-sulfobutan-2-yl(meth)acrylates, 2-sulfobutyl(meth)acrylates, and 3-sulfobutan-2-yl(meth)acrylates. One member or a mixture of two or more members selected from the group of sulfonic acid group-containing unsaturated monomers cited above can be used. Especially, at least one monomer selected from the group consisting of sulfoethyl(meth)acrylates, sulfopropyl(meth)acrylates, and 2-acrylamide-2-methylpropane sulfonic acid or a salt thereof is advantageously used herein because of ready commercial availability.

Examples of the other polymerizable monomer (B) which is usable in the present invention include carboxyl group-containing unsaturated monomers such as unsaturated carboxylic acids like acrylic acid, methacrylic acid, crotonic acid, itaconic acid, maleic acid, fumaric acid, and citraconic acid and alkali metal salts, alkaline earth metal salts, ammonium salts, and organic amine salts of the unsaturated carboxylic acids; water-soluble unsaturated monomer such as (meth)acrylamides, (meth)acrylonitriles, vinyl acetate, N,N-dimethylaminoethyl(meth)acrylates, and 2-[(meth)acryloyloxyethyl]trimethylammonium chlorides; and hydrophobic unsaturated monomers such as styrene and (math)acrylic esters like hydroxyethyl(meth)acrylate, hydroxypropyl(meth)acrylates, polyethylene glycol mono(meth)acrylates, polypropylene glycol mono(meth)acrylates, polybutylene glycol mono(meth)acrylates, methoxypolyethylene glycol mono(meth)acrylates, methoxypolypropylene glycol mono(meth)acrylates, methoxypolybutylene glycol mono(meth)acrylates, ethoxpo.lyethylene glycol mono(meth)acrylates, ethoxypropylene glycol mono(meth)acrylates, ethoxypolybutylene glycol mono(meth)acrylates, methoxypolyethylene glycol-polypropylene glycol mono(meth)acrylates, phenoxypolyethylene glycol mono(meth)acrylates, benzyloxypolyethylene glycol mono(meth)acrylates, methyl (meth)acrylates, ethyl (meth)acrylates, and butyl (meth)acrylates. One member or a mixture of two or more members selected from the group of other polymerizable monomers cited above can be used.

In the method for producing the cross-linked macromolecular compound by the polymerization of (A) a sulfonic acid group-containing unsaturated monomer optionally in the presence of (B) other polymerizable monomer, the amount of (A) the sulfonic acid group-containing unsaturated monomer to be used is desired to fall in the range of 5 to 100 mol%, preferably 8 to 100 mol%, and that of (B) the other polymerizable monomer in the range of 95 to 0 mol%, preferably 92 to 0 mol%. If the amount of (A) the sulfonic acid group-containing unsaturated monomer is less than 5 mol%, the cross-linked macromolecular compound containing a sulfonic acid group or a salt thereof and a dissociating group in the respective ranges defined above is obtained with difficulty. When the cross-linked macromolecular compound obtained at all is used as a waterproofing agent for cables, the waterproofing agent is liable to manifest the waterproofing effect insufficiently.

Examples of (C) the cross-linking agent which is usable in the present invention include compounds possessing two or more ethylenically unsaturated groups in the molecular unit thereof such as divinylbenzene, ethylene glycol di(meth)acrylates, diethylene glycol di(meth)acrylates, triethylene glycol di(meth)acrylates, propylene glycol di(meth)acrylates, polyethylene glycol di(meth)acrylates, trimethylol propane tri(meth)acrylates, pentaerythritol tri(meth)acrylates, pentaerythritol di(meth)acrylates, N,N-methylenebisacrylamide, triallyl isocyanurate, trimethylol propne diallyl ether; polyhydric alcohols such as ethylene glycol, diethylene glycol, triethylene glycol, polyethylene glycol, glycerol, polyglycerol, propylene glycol, diethanolamine, triethanolamine, polypropylene glycol, polyvinyl alcohol, pentaerythritol, sorbit, sorbitan, glucose, mannitol, mannitan, sucrose, and dextrose; and polyepoxy compounds such as ethylene glycol diglycidyl ether, glycerol diglycidyl ether, polyethylene glycol diglycidyl ether, propylene glycol diglycidyl ether, polypropylene glycol diglycidyl ether, neopentyl glycol diglycidyl ether, 1,6-hexanediol diglycidyl ether, trimethylol propane diglycidyl ether, trimethylol propane triglycidyl ether, and glycerol triglycidyl ether. One member or a mixture of two or more members selected from the group of cross-linking agents cited above can be used. The polymer obtained during the course of the production is desired to be given a heat treatment at a temperature in the range of 150° to 250° C. when a polyvalent alcohol is used as the cross-linking agent or at a temperature in the range of 50° to 250° C. when a polyepoxy compound is alternatively used. The use of such a cross-linking agent is desirable in the sense that it permits free control of the cross-link density of the cross-linked macromolecular compound to be produced. The amount of the cross-linking agent to be used is desired to fall in the range of 0.00001 to 0.3 in molar ratio relative to the amount of the monomer mentioned above. If the amount of the cross-linking agent exceeds 0.3 in molar ratio, the cross-link density of the produced cross-linked macromolecular compound is so large as to lower the compound's ability for water absorption. Conversely, if this amount is less than 0.00001 in molar ratio, then the produced cross-linked macromolecular compound acquires an unduly small cross-link density and tends to form a viscous texture with absorbed water and, consequently, jeopardizes the ease of its own handling The polymerization for the production of the cross-linked macromolecular compound usable advantageously as the waterproofing agent of this invention for cables can be carried out by any of the conventional methods available for this purpose. The method which resorts to use of a radical polymerization catalyst and the method which relies on irradiation with radiant ray, electron beam, or ultraviolet light are examples. As catalyst for the radical polymerization, radical generatnig agents including such peroxides as hydrogen peroxide, benzoyl peroxide, and cumene hydroperoxide, such azo compound as azobisisobutylonitrile, and such persulfates as ammonium persulfate and potassium persulfate, and redox type initiators produced by combining such radical generating agents with such reducing agents as sodium hydrogen sulfite, L-ascorbic acid, and ferrous salts are available. Examples of the solvent for the polymerization system include water, methanol, ethanol, acetone, dimethyl formamide, and dimethyl sulfoxide and various mixtures thereof. Though the temperature of the polymerization is variable with the kind of the catalyst to be used, it is desired to be relatively low in the sense that the molecular weight of the cross-linked macromolecular compound is large where the temperature is relatively low. To ensure completion of this polymerization, however, the temperature is desired to be in the range of 20° to 100° C.

The monomer concentration in the polymerization system is not specifically defined by the invention. Where the ease of control of the polymerization reaction and the yield and economy of the reaction are taken into consideration, the monomer concentration is desired to fall in the range of 20 to 80% by weight, preferably 30 to 60% by weight The polymerization can be carried out in any of various forms known in the art. Among other methods available, the suspension polymerization, the cast polymerization, and the method which effects polymerization while finely dividing a gel type water-containing polymer by the shearing force of a twin arm type kneader (Japanese Patent Laid-Open SHO 57(1982)-34,101) prove to be particularly desirable.

The cross-linked macromolecular compound obtained as described above may be used in its unmodified form as a waterproofing agent to be packed in the space inside the sheath of the cable. Optionally, this waterproofing agent may be used in this case as mixed with asbestos, pulp, synthetic fibers, or natural fibers.

Optionally, this cross-linked macromolecular compound may be combined with fibers, rubber, plastic, or non-woven fabric so as to be used as a waterproofing material of the form which warrants high workability at the time of packing and effects desired waterproofing with high efficiency. The following methods (1) to (4) are available for this combination.

(1) The method which produces a fibrous waterproofing material by adding the cross-linked macromolecular compound to a spinning solution of synthetic fibers, for example, and spinning the mixed spinning solution or by immobilizing the cross-linked macromolecular compound on such fibrous substance as synthetic fibers or natural fibers through the medium of a tacky substance. This fibrous waterproofing material may be packed in its unmodified form in the sheath or it may be fabricated in the form of cloth before it is put to use.

(2) The method which produces a waterproofing material in the form of sheet or tape by blending the cross-linked macromolecular compound with rubber or plastic and molding the resultant mixture with rolls or an extruding machine.

(3) The method which produces a waterproofing material in the form of sheet or tape by immobilizing the cross-linked macromolecular compound on a sheet or tape of non-woven fabric, woven fabric, or paper through the medium of a tacky substance or interposing the cross-linked macromolecular compound between opposed sheets or tapes of non-woven fabric, woven fabric, or paper.

(4) The method which produces a waterproofing material in the form of sheet or tape by applying the cross-linked macromolecular compound as mixed with a tacky substance or a coating material to a plastic film, for example, and then optionally cutting the coated film.

The method of this invention for waterproofing a cable is characterized by the fact that the specific cross-linked macromolecular compound as a waterproofing agent is packed in its unmodified form in the sheath of the cable, the fact that the cross-linked macromolecular compound is immobilized on a fibrous substance by the method of combination indicated in (1) above and used as a fibrous waterproofing material to be packed in the sheath of the cable, or by the fact that the cross-linked macromolecular compound is immobilized on the surface of a film or sheet by the method of combination indicated in (2) to (4) above and used as a waterproofing material in the form of sheet or tape to be packed in the sheath of the cable. Particularly the waterproofing treatment which is effected on a given cable by wrapping metallic wires or optical fibers to be contained in the sheath of the cable with the waterproofing material in the form of sheet or tape proves to be desirable because the otherwise possible local deviation of the waterproofing effect along the length of the cable can be easily precluded by this treatment.

Examples of the organic polymer type binder to be used in the present invention in immobilizing the cross-linked macromolecular compound on the surface of a film or sheet include polyurethane, polyester, polyamide, ethylene-vinyl acetate copolymer, acrylic acid (co)-polymer, polyvinyl alcohol, hydroxyethyl cellulose, carboxymethyl cellulose, and polyacrylic ester.

Among other organic polymer type binders cited above, a urethanated substance obtained by the reaction of an isocyanate compound with a water-soluble polyalkylene oxide having an average molecular weight of not less than 50,000 proves to be particularly desirable because the waterproofing material consequently obtained in the form of film or sheet exhibits a very high swelling speed on contact with an aqueous liquid. The water-soluble polyalkylene oxide to be used in the production of this urethanated substance has an average molecular weight of not less than 50,000. If this average molecular weight is less than 50,000, the produced waterproofing material in the form of film or sheet exhibits a small swelling speed on contact with the aqueous liquid and manifests a sufficient waterproofing effect with difficulty. As the polyalkylene oxide fit for this invention, a water-soluble polyethylene oxide or a product obtained by copolymerizing the water-soluble polyethylene oxide with other alkylene oxide such as propylene oxide added thereto in an amount incapable impairing the water-solubility of the polyethylene oxide. A polyethylene oxide having an average molecular weight in the range of 50,000 to 2,000,000 proves to be particularly desirable. The isocyanate compound contemplated herein is a compound containing one or more isocyanate groups in the molecular unit thereof. Examples of the isocyanate compound include 2,4-tolylene diisocyanate, 2,6-tolylene diisocyanate, 1-methylbenzene-2,4,6-triisocyanate, naphthalene-1,3,7-triisocyanate, biphenyl-2,4,4'-triisocyanate, 1,3-dimethylbenzene-2,4-diisocyanate, phenylene diisocyanate, n-propyl isocyanate, n-butyl isocyanate, n-hexyl isocyanate, octadecyl isocyanate, cyclohexyl isocyanate, benzyl isocyanate, phenyl isocyanate, propane diisocyanate, hexane diisocyanate, decane diisocyanate, proprietary compounds (produced by Nippon Polyurethane Industry Co., Ltd. and marketed under trademark designations of "Coronate® L" and "Coronate® HL"), and proprietary compounds (produced by Sumitomo Bayer Urethane Co., Ltd. and marketed under trademark designations of "Sumidur® N," "Sumidur® L," "Sumidur® HL," and "Sumidur® IL"), and mixtures thereof. Optionally, such an isocyanate compound may be used as masked with a suitable masking agent.

The production of the urethanated substance suitable as a binder by the reaction of a polyalkylene oxide with an isocyanate compound is accomplished simply by retaining these compounds, materials for the reaction, at a temperature in the range of 40° to 160° C., when necessary, in water or a varying organic solvent as a reaction solvent. This reaction is carried out by the conventional method available for the purpose of urethanation, optionally in the presence of a promotor. Examples of the promotor for this urethanation include such amino compounds as triethylamine, tetraethylamine, and triethylene diamine; morpholine derivatives; piperazine derivatives; and such tin compounds as dibutyl tin dichloride and dilaurin tin dichloride.

The urethanated substance obtained as described above is used herein as an organic polymeric binder for immobilizing the cross-linked macromolecular compound on fibers or on the surface of a film or sheet.

The organic polymer type binder for this invention is desired to be used in an amount in the range of 5 to 300 parts by weight, preferably 10 to 100 parts by weight, based on 100 parts by weight of the cross-linked macromolecular compound. If this amount is less than 5 parts by weight, the immobilization of the cross-linked macromolecular compound is not obtained sufficiently. If this amount exceeds 300 parts by weight, the waterproofing material to be produced in the form of film or tape exhibits an insufficient swelling ratio and possibly fails to bring about a sufficient waterproofing effect.

As means for immobilizing the cross-linked macromolecular compound of the present invention on fibers or on the surface of a film or sheet, the method which comprises applying a binder to the fibers or to the surface of the film or sheet and subsequently spraying the cross-linked macromolecular compound on the applied layer of the binder and the method which comprises mixing the cross-linked macromolecular compound with the binder and applying the resultant mixture to the fibers or to the surface of the film or sheet can be cited. Particularly where the urethanated substance is used as the binder, the method can be used which comprises mixing the cross-linked macromolecular compound with the polyalkylene oxide and the isocyanate compounds, i.e. the raw materials for the urethanated substance, applying the resultant mixture to the fibers or to the surface of the film or sheet, and retaining the coated fibers or the coated film or sheet at a temperature in the range of 40° to 160° C., preferably 70° to 120° C. thereby forming a urethanated substance on the fibers or on the surface of the sheet or film.

In the application of the cross-linked macromolecular compound and/or the binder, a solvent may be used when necessary. Examples of the solvent include water, methanol, ethanol, isopropyl alcohol, acetone, dimethyl formamide, dimethyl acetamide, dimethyl sulfoxide, ethyl acetate, and mixtures thereof. Examples of the solvent particularly fit for the urethanated substance include nitromethane, acetonitrile, benzene, toluene, xylene, dimethyl formamide, dimethyl acetamide, dimethyl sulfoxide, tetrahydrofuran, dioxane, diethyl ether, ethylene dichloride, carbon tetrachloride, chloroform, ethyl acetate, methylisobutyl ketone, acetone, water and mixtures thereof.

In the immobilization of the cross-linked macromolecular compound with the oragnic polymer type binder, the cross-linked macromolecular compound may be immobilized on the fibers or on the surface of the film or sheet by in conjunction with a filler as by mixing the filler with the cross-linked macromolecular compound and/or the binder. Examples of the filler include various inorganic powders such as silica, alumina, synthetic silicates, magnesium carbonate, magnesium silicate, calcium carbonate, bentonite, kaolinite, carbon black, zeolite, activated clay, titanium oxide, and mixtures thereof. The filler is desired to have an average particle diameter of not more than 20 microns. When the cross-linked macromolecular compound and an inorganic powder having an average particle diameter of not more than 20 microns are jointly immobilized on the fibers or on the surface of the film or sheet to produce a waterproofing material, the produced waterproofing material proves to be desirable because it exhibits an enhanced swelling speed on contact with an aqueous liquid.

The average particle diameter of the inorganic powder as reported in the present invention represents a magnitude determined by the sedimentation velocity method. If this average particle diameter exceeds 20 microns, the waterproofing material produced in the form of film or tape has only a small effect in the improvement of the swelling speed upon contact with the aqueous liquid. Among various inorganic powders of the description given above, a microfine silica powder having an average particle diameter of not more than 1 micron typified by a proprietary silica (produced by Japan Aerosil Co., Ltd. and marketed under trademark designation of "Aerosil") proves to be particularly desirable in the sense that it excels in the ability for adsorption to the cross-linked macromolecular compound owing to the smallness of the particle diameter.

The inorganic powder to be used advantageously in the production of the waterproofing material in the form of fibers, sheet, or tape is desired to be mixed with the cross-linked macromolecular compound in an amount in the range of 0.05 to 50 parts by weight, based on 100 parts by weight of the macromolecular compound. If this amount is less than 0.05 part by weight, the added inorganic powder fails to manifest the expected effect in enhancing the swelling speed of the waterproofing with absorbed aqueous liquid. If this amount exceeds 50 parts by weight, the proportion of the cross-linked macromolecular compound to the entire composition decreases and the swelling ratio of the water-proofing material proportionately decreases and the waterproofing effect cannot be enhanced.

To be used in this invention, the cross-linked macromolecular compound may be in any form. It is desired to be in the form powder having an average particle diameter of not more than 200 microns in the sense that it can be deposited and immobilized easily on such substrate as fibers, film, or sheet to produce a waterproofing material and the produced waterproofing material exhibited a high swelling speed.

In the preparation of the coating composition used for the immobilization of the cross-linked macromolecular compound on the fibers or on the surface of film or sheet, the cross-linked macromolecular compound, the organic polymer type binder, the inorganic powder, and such optional additives as the solvent, the tackifier, and the dispersant are mixed irrespectively of the order of addition. For example, the cross-linked macromolecular compound may be mixed with the inorganic powder first and the organic plastic binder type added to the resultant mixture. Otherwise, the cross-linked macromolecular compound and the inorganic powder may be added together to the organic plastic type binder.

Examples of the fibers on which the cross-linked macromolecular compound is to be immobilized in this invention include such synthetic fibers as acryl, nylon, and polyester; such natural fibers as cotton and wool; such regenerated fiber as rayon, and such inorganic fibers as glass fibers. Examples of the film or sheet on which the cross-linked macromolecular compound is to be immobilized include paper, woven fabric, and nonwoven fabric made of the fibers mentioned above; sheets of such plastic substances as polyester, polyvinyl chloride, polyethylene, polypropylene, polycarbonate, and cellophane, and foils of such metals as aluminum.

The present invention does not specifically defined the thickness of the layer of the coating composition to be applied to the surface of the film or sheet. In due consideration of the convenience of handling of the waterproofing material in the form of film or tape and the effect to be manifested in waterproofing cables, however, this thickness is desired to be in the range of 10 to 300 microns, preferably 30 to 150 microns. The application of the coating composition may be made on either or both of the opposite surfaces of the film or sheet.

Now, the present invention will be described more specifically below with reference to working examples. It should be noted that the scope of the present invention is not limited to these working examples. Wherever the term "parts" is mentioned in the examples, it invariably refers to "parts by weight."

EXAMPLE 1

In a cylindrical·separable flask having an inner volume of 500 ml, 21.6 g. (0.10 mol) of sodium salt of 2-sulfoethyl methacrylate, 21.5 g (0.25 mol) of methacrylic acid, 70.2 g. (0.65 mol) of sodium methacrylate, 0.92 g. (0.006 mol) of N,N-methylenebisacrylamide, and 170 g. of water were stirred until homogeneous solution. The flask was subjected to displacement of the entrapped air with nitrogen and was heated to 40° C. over a water bath. The contents of the flask, with 1.0 g. of an aqueous 10% ammonium persulfate solution and 0.5 g. of an aqueous 1% L-ascorbic acid solution added thereto and the stirring discontinued, were left polymerizing. The reaction system began to evolve heat on initiation of the polymerization and reached 95° C. after 30 minutes of the polymerization. After the start of temperature fall of the polymerization system was confirmed, the polymerization system was heated further for one hour with the temperature of the water bath kept at 90° C. The hydrated gel of a cross-linked macromolecular compound consequently obtained was crushed, then dried in a hot air dryer at 150° C for three hours, and pulverized to obtain a waterproofing agent (1) of the present invention.

EXAMPLE 2

In a cylindrical separable flask having an inner volume of 500 ml, 157 g. (0.70 mol) of ammonium 2-acrylamide-2-methylpropanesulfonate, 21.3 g (0.30 mol) of acrylamide, 0.31 g. (0.002 mol) of N,N-methylenebisacrylamide, and 270 g. of water were stirred until homogeneous solution. The contents of the flask were then subjected to polymerization, drying, and pulverization by following the procedure of Example 1, to obtain a waterproofing agent (2) of the present invention.

EXAMPLE 3

In a four-neck flask having an inner volume of 500 ml and provided with a stirer, a reflux condenser, a dropping funnel, and a nitrogen gas inlet tube, 1.8 g of sorbitan monostearate was dissolved in 220 ml of n-hexane and the entrapped air was displaced with nitrogen. In the dropping funnel, 23.3 g. (0.10 mol) of calcium salt of 3-sulfopropyl acrylate, 0.72 g (0. 01 mol) of acrylic acid, 5.55 g (0.05 mol) of calcium acrylate, 4.25 g. (0.05 mol) of methacrylamide, 0.0174 g. (0.0001 mol) of ethylene glycol diglycidyl ether, 50 g. of water, and 0.05 g of potassium persulfate were dissolved and the resultant aqueous solution was blown with nitrogen gas to expel the oxygen persisting therein. Then, the contents of the dropping funnel were added into the four-neck flask and dispersed therein. The resultant reaction system, under continued introduction of a small amount of nitrogen gas and continued application of heat for the maintenance of the temperature of the system in the range of 60° to 65° C., was left polymerizing for three hours. Thereafter, the contents of the flask were distilled under a vacuum to expel n-hexane. The residue of the distillation, namely a hydrated gel of cross-linked macromolecular compound, was dried under a vacuum at 90° C., to obtain a waterproofing agent (3) of this invention.

EXAMPLE 4

In a cylindrical separable flask having an inner volume of 1,000 ml, 51 g. (0.2 mol) of monoethanolamine salt of 2-sulfoethyl methacrylate, 4.3 g . (0.05 mol) of methacrylic acid, 16.2 g. (0.15 mol) of sodium methacrylate, 216 g (0.4 mol) of methoxypolyethylene glycol monomethacrylate (containing an average of 10 ethylene oxide unit per molecule), 0.154 g (0.001 mol) of N,N-methylenebisacrylamide, and 50 g of water were stirred until homogeneous solution. Then, the resultant aqueous solution was subjected to polymerization, drying, and pulverization by following the procedure of Example 1, to obtain a waterproofing agent (4) of the present invention.

EXAMPLE 5

Three hundred (300) g. of an aqueous 20% solution of partially neutralized polyacrylic acid (having an average molecular weight of 300,000) obtained by polymerizing a monomer mixture containing of 50 mol% of acrylic acid and 50 mol% of sodium acrylate was homogeneously mixed with 267 g. of an aqueous 10% sodium hydroxyethanesulfonate solution and 0.05 g. of glycerol. In a tray 40 cm×50 cm in top area, the resultant mixture was dried at 150° C. for three hours and subsequently subjected to a heat treatment at 200° C. for two hours to effect sulfonation and cross-linking of the polyacrylic acid. Thus obtained cross-linked macromolecular compound was pulverized to obtain a waterproofing agent (5) of the present invention.

Control 1

In a cylindrical separable flask having an inner volume of 500 ml, 18 g. (0.25 mol) of acrylic acid, 70.5 g (0.75 mol) of sodium acrylate, 0.92 g (0.006 mol) of N,N-methylenebisacrylamide, and 135 g of water were stirred until homogeneous solution. The resultant aqueous solution was subjected to polymerization, drying, and pulverization by following the procedure of Example 1, to obtain a waterproofing agent (1) for comparison.

EXAMPLES 6 TO 10

A glass bar 11 mm in diameter and 2,000 mm in length was inserted coaxially in a glass tube 15 mm in inside diameter and 2,000 mm in length to form a tubular gap 2 mm in thickness between the inner wall surface of the glass tube and the surface of the glass bar. This gap in the glass tube was filled with a mixture of 18 g. of a given one of the waterproofing agents (1) to (5) of this invention obtained in Examples 1 to 5 with 18 g. of pulp, to produce an imitation cable.

This imitation cable was fixed horizontally. A container filled with 1 liter of synthetic sea water having the composition shown in Table 2 was connected to one end of the imitation cable, with the liquid level in the container held at a height of 1,000 mm from the imitation cable. Then, the cock at the bottom of the container was opened to lead the synthetic sea water to the imitation cable. The condition of the penetration of the synthetic sea water into the imitation cable was evaluated in terms of the distance between the inlet end of the imitation cable and the leading end of the tubular column of synthetic sea water which had permeated into the imitation cable. The results of the evaluation and the physical properties of the waterproofing agents (1) to (5) of the present invention used in the test were shown in Table 1.

Control 2

An imitation cable was prepared and evaluated by following the procedure of Examples 6 to 10, except that the waterproofing agent (1) for comparison obtained in Control 1 was used instead. The results of the evaluation were shown in Table 1.

TABLE 1

| | Waterproofing agent used | | | Distance of permeation of synthetic sea water (mm) | |
|---|---|---|---|---|---|
| | Kind | Ability to absorb deionized water (times own weight) | Content of sulfonic acid or salt thereof (mg eq/g) | Content of dissociating group (mg eq/g) | 1st day of introduction of synthetic sea water | 14th day of introduction of synthetic sea water |
| Example 6 | waterproofing agent (1) | 106 | 0.85 | 8.58 | 120 | 210 |
| Example 7 | waterproofing agent (2) | 152 | 3.80 | 3.80 | 150 | 180 |
| Example 8 | waterproofing agent (3) | 240 | 2.96 | 4.73 | 80 | 120 |
| Example 9 | waterproofing agent (4) | 23 | 0.67 | 1.34 | 200 | 450 |
| Example 10 | waterproofing agent (5) | 183 | 1.71 | 9.10 | 110 | 180 |
| Control 2 | waterproofing agent (1) for comparison | 113 | 0 | 11.0 | 300 | 900 |

TABLE 2

| Composition of synthetic sea water | |
|---|---|
| Kind of salt | Concentration (g/kg) |
| $CaSO_4$ | 1.38 |
| $MgSO_4$ | 2.10 |
| $MgCl_2$ | 3.32 |
| KCl | 0.72 |
| NaCl | 26.69 |

EXAMPLES 11 TO 15

In a liquid obtained by mixing 20 g. of polyacrylic ester having an average molecular weight of 60,000 obtained by polymerizing a monomer mixture containing of 35% by weight of methyl methacrylate, 40% by weight of butyl acrylate, 15% by weight of acrylic acid, and 10% by weight of hydroxyethyl methacrylate with 40 g. of a given one of the waterproofing agents (1) to (5) obtained in Examples 1 to 5 and 40 g. of isopropyl alcohol acryl fibers 3 deniers in thickness were immersed. The impregnated acrylfibers were removed from the liquid and immediately subjected to drying at 80° C. for ten minutes.

The fibrous waterproofing materials (1) to (5) consequently obtained were each immersed in synthetic sea water having the composition shown in Table 2 and, after one hour's and 30 days' standing therein, weighed to find ratios of absorption by calculation in accordance with the following formula. Separately, the waterproofing materials (1) to (5) were tested for amount of crosslinked macromolecular compound and polyacrylic ester (binder) deposited per g of acrylic fibers. The results are shown in Table 3.

$$\text{Ratio of absorption (times own weight)} = \frac{\text{Weight of waterproofing material (g) after immersion in synthetic sea water}}{\text{Weight of waterproofing material (g) before immersion in synthetic sea water}}$$

Control 3

A fibrous waterproofing material (1) for comparison was produced by following the procedure of Examples 11 to 15, except that the waterproofing agent (1) for comparison obtained in Control 1 was used instead. The waterproofing material (1) for comparison was tested for liquid absorption ratio and other properties also by following the procedure of Examples 11 to 15. The results are shown in Table 3.

TABLE 3

| | Waterproofing agent used | Waterproofing material obtained | Amount deposited (g/g) (Note) | Waterproofing material's ratio of liquid absorption (times own weight) | |
|---|---|---|---|---|---|
| | | | | After 1 hour's standing | After 30 day's standing |
| Example 11 | waterproofing agent (1) | waterproofing material (1) | 0.82 | 5.1 | 5.0 |
| Example 12 | waterproofing agent (2) | waterproofing material (2) | 0.78 | 6.9 | 7.2 |
| Example 13 | waterproofing agent (3) | waterproofing material (3) | 0.76 | 9.0 | 9.2 |
| Example 14 | waterproofing agent (4) | waterproofing material (4) | 0.85 | 4.5 | 4.6 |
| Example 15 | waterproofing agent (5) | waterproofing material (5) | 0.78 | 5.2 | 5.1 |
| Control 3 | waterproofing agent (1) for comparison | waterproofing material (1) for comparison | 0.80 | 2.8 | 1.3 |

Note $$\text{Amount deposited (g/g)} = \frac{\text{(Weight of fibrous waterproofing material)} - \text{(Weight of acrylic fibers used for production of waterproofing material)}}{\text{(Weight of acrylic fibers used for production of waterproofing material)}}$$

EXAMPLE 16

The waterproofing agent (1) obtained in Example 1 was classified to obtain a powder passing a standard 150-mesh sieve (hereinafter referred to as "cross-linked macromolecular compound (1)").

A solution obtained by adding 370 parts of nitromethane to 30 parts of polyethylene oxide having an average molecular weight of 100,000 and 0.01 part of dibutyl tin dichloride was combined with 100 parts of the cross-linked macromolecular compound (1), 0.5 part of Sumidur N-75 (product of Sumitomo Bayer Urethane Co., Ltd.), and 2 parts of Aerosil R972 (hydrophobic microfine silica powder having an average molecular weight of 0.016 micron; produced by Nippon Aerosil Co., Ltd.) to produce a coating composition.

With a bar coater, this composition was applied in a thickness of 120 microns on both surfaces of a polyester film 25 microns in thickness. The coated film was heated at 80° C. for 10 minutes to produce a waterproofing tape (1).

EXAMPLE 17

The waterproofing agent (5) obtained in Example 5 was classified to obtain a powder passing a standard 400-mesh sieve (hereinafter referred to as "cross-linked macromolecular compound (2)").

A solution obtained by adding 30 parts of polyethylene oxide having an average molecular weight of 800,000 and 0.05 parts of triethylene diamine to 470 parts of acetonitrile was combined with 0.1 part of 2,4-tolylene diisocyanate, left reacting in a current of nitrogen at 70° C. for five hours, to produce an acetonitrile solution of a urethanated substance. A coating composition was prepared by adding 100 parts of the cross-linked macromolecular compound (2) to the solution.

This composition was applied to the surfaces of a polyester film by following the procedure of Example 16 and the coated film was dried to obtain a waterproofing tape (2).

EXAMPLE 18

A mixed solution containing of 60 parts of Pluronic P-85(a proprietary product of Asahi Denka Kogyo K.K.) 6.9 parts of Sumidule N-75 ( a proprietary product of Sumitomo Bayer Urethane Co., Ltd.), and 10 parts of ethyl acetate was combined with 100 parts of the cross-linked macromolecular compound (1) obtained in Example 16 and 3 parts of a microfine silica powder having an average particle diameter of 0.012 micron (produced by Nippon Aerosil Co., Ltd. and marketed under trademark designation of "Aerosil 200"). A coating composition was obtained by homogeneously mixing this solution with a solution of 0.02 part of dibutyl tin dichloride in 1 part of ethyl acetate.

A waterproofing tape (3) was obtained by applying this composition in a thickness of 120 microns to both surfaces of a polyester film 25 microns in thickness with a bar coater.

Control 4

The waterproofing agent (1) for comparison obtained in Control 1 was classified to obtain a powder passing a standard 400-mesh sieve (hereinafter referred to as "cross-linked macromolecular compound (1) for comparison").

A waterproofing tape (1) for comparison was obtained by following the procedure of Example 17, except that the cross-linked macromolecular compound (1) for comparison was used in place of the cross-linked macromolecular compound (2).

Control 5

A waterproofing tape (2) for comparison was obtained by following the procedure of Control 4, except that 30 parts of polyethylene glycol having an average molecular weight of 10,000 was used in the place of the polyethylene oxide possessing an average molecular weight of 800,000 used in Control 4.

EXAMPLES 19 TO 21 AND CONTROLS 6 AND 7

On a glass bar 13.5 mm in diameter and 2,000 mm in length, a given one of the waterproofing tapes (1) to (3) obtained in Examples 16 to 18 and the waterproofing tapes (1) and (2) for comparison obtained in Controls 4 and 5 was wound up spirally in one ply. The glass bar wrapped in the waterproofing tape was inserted into a glass tube 15 mm in inside diameter and 2,000 mm in length so as to form a uniform tubular gap inside the glass tube, to produce an imitation cable for evaluation of waterproofing effect.

This imitation cable was laid horizontally. A container filled with 1 liter of tap water was connected with a rubber tube to one end of the imitation cable, with the liquid level in the container held at a height of 1,000 mm from the imitation cable. Then the cock at the base of the container was opened to lead the tap water to the imitation cable. The condition of the permeation of tap water into the imitation cable was evaluated in terms of the distance between the inlet end of the imitation cable and the leading end of the tubular column of tap water which had permeated in the cable within one hour. The results are shown in Table 4.

TABLE 4

|  | Waterproofing tape used | Distance of permeation of tap water (mm) within one hour |
| --- | --- | --- |
| Example 19 | Waterproofing tape (1) | 230 |
| Example 20 | Waterproofing tape (2) | 320 |
| Example 21 | Waterproofing tape (3) | 300 |
| Control 6 | Waterproofing tape (1) for comparison | 450 |
| Control 7 | Waterproofing tape (2) for comparison | Not less than 2,000 (Note) |

(Note)
The tap water leaked from the other end of the imitation cable to which no rubber tube was connected.

EXAMPLES 22 TO 24 AND CONTROLS 8 AND 9

On a glass bar 14 mm in diameter and 2,000 mm in length, a given one of the waterproofing tapes (1) to (3) obtained in Examples 16 to 18 and the waterproofing tapes (1) and (2) for comparison obtained in Controls 4 and 5 was wound up spirally in one ply. The glass bar thus wrapped in the water-proofing tape was inserted into a glass tube 15 mm in inside diameter and 2,000 mm in length so as to form a uniform tubular gap inside the glass tube, to produce an imitation cable for evaluation of waterproofing effect.

This imitation cable was laid horizontally. A container filled with 1 liter of the same synthetic sea water as used in Examples 6 to 10 was connected with a rubber tube to one end of the imitation cable, with the liquid level in the container held at a height of 1,000 mm from the imitation cable. Then the cock at the base of the container was opened to lead the synthetic sea water to the imitation cable. The condition of permeation of the synthetic sea water into the imitation cable was evaluated in terms of the distance between the inlet end of the imitation cable to the leading end of the tubular column of synthetic sea water which had permeated in the imitation cable within one hours. The results are shown in Table 5.

TABLE 5

| | Waterproofing tape used | Distance of permeation of synthetic sea water (mm) within one hour |
|---|---|---|
| Example 22 | Waterproofing tape (1) | 350 |
| Example 23 | Waterproofing tape (2) | 570 |
| Example 24 | Waterproofing tape (3) | 510 |
| Control 8 | Waterproofing tape (1) for comparison | 1200 |
| Control 9 | Waterproofing tape (2) for comparison | Not less than 2,000 (Note) |

(Note)
The synthetic sea water leaked from the other end of the imitation cable to which no rubber tube was connected.

Industrial Applicability

The waterproofing agent of this invention for cables possesses an outstanding ability to resist salts and is capable of absorbing in a very high ratio not only rain water and subterranean water but also aqueous liquids containing salts in high concentration like sea water and, at the same time, retaining the ability for liquid absorption intact for a long time.

When the waterproofing agent of this invention is packed in the sheaths of cables such as communication cables, electric power cables, copper-wire coaxial cables, and optical fiber cables, for example, aqueous liquids such as sea water and subterranean water seeping into the sheaths of the cables are prevented from moving inside the sheaths. Thus, the use of this waterproofing agent permits production of cables which exhibit a stable waterproofing ability and outstanding durability for a very long time.

The waterproofing material produced in the form of sheet or tape by immobilizing the waterproofing agent of this invention on the surface of a film or sheet excels in workability at the time of waterproofing cables. Since it exhibits a very high swelling speed on contact with an aqueous liquid, it is capable of instantaneously stopping the advance of an aqueous liquid seeping into the sheaths of the cables.

When the waterproofing material in the form of sheet or tape is packed in the gaps inside the sheaths of cables, it perfectly precludes the possibility of the aqueous liquid traveling a very long distance from the point of entry and approaching communication wires, electric power wires, or optical fibers or entering various devices to which the cables are connected. It manifests a waterproofing effect sufficiently at a small packing rate.

We claim:

1. A method for waterproofing an optical or electric cable, which comprises packing in the sheath of said cable a cross-linked macromolecular compound containing a sulfonic acid group or a salt thereof in an amount of not less than 0.5 mg. equivalent/g. and a dissociating group in an amount of not less than 1.0 mg. equivalent/g. and having the ability to absorb deionized water in the range of 50 to 1000 times its own weight, said cross-linked macromolecular compound being produced by polymerizing a monomer mixture consisting essentially of (A) 5 to 100 mol% of at least one sulfonic acid group unsaturated monomer selected from the group consisting of sulfoethyl(meth)acrylate, sulfopropyl(meth)acrylate, and 2-acrylamide-2-methyl propanesulfonic acid or salt thereof and (B) 95 to 0 mol% of at least one other unsaturated monomer selected from the group consisting of methacrylic acid, sodium methacrylate, acrylamide, acrylic acid, calcium acrylate, methacrylamide, methoxypolyethylene glycol monomethacrylate and sodium acrylate in the presence of a cross-linking agent in the range of 0.00001 to about 0.3 in molar ratio, based on said monomer mixture.

2. A method waterproofing an optical or electric cable, which comprises immobilizing a cross-linked macromolecular compound containing a sulfonic acid group or a salt thereof in an amount of not less than 0.5 mg. equivalent/g. and a dissociating group in an amount of not less than 1.0 mg. equivalent/g. and having the ability to absorb deionized water in the range of 50 to 1000 times its own weight, said cross-linked macromolecular compound being produced by polymerizing a monomer mixture consisting essentially of (A) 5 to 100 mol% of at least one sulfonic acid group unsaturated monomer selected from the group consisting of sulfoethyl(meth)acrylate, sulfopropyl(meth)acrylate, and 2-acrylamide-2-methyl propanesulfonic acid or salt thereof and (B) 95 to 0 mol% of at least one other unsaturated monomer selected from the group consisting of methacrylic acid, sodium methacrylate, acrylamide, acrylic acid, calcium acrylate, methacrylamide, methoxy-polyethylene glycol monomethacrylate and sodium acrylate in the presence of a cross-linking agent in the range of 0.00001 to about 0.3 in molar ratio, based on said monomer mixture, on the surface of a film or sheet with an organic polymer type binder; and backing the immobilized compound in the sheath of said cable.

3. A method according to claim 2 wherein said waterproofing material in the form of sheet or tape is obtained by applying to the surface of a film or sheet a composition produced by mixing 100 parts by weight of a cross-linked macromolecular compound with 5 to 300 parts by weight of an organic polymer type binder and 0.05 to 50 parts by weight of an inorganic powder having an average particle diameter of not more than 20 microns.

4. A method according to claim 3, wherein said inorganic powder is a microfine silica powder having an average particle diameter of not more than 1 micron.

5. A method according to claim 1, wherein said cross-linked macromolecular compound is obtained by polymerizing a polymerizable monomer optionally in the presence of a cross-linking agent and sulfonating the resultant polymer with a sulfonating agent optionally in the presence of a cross-linking agent.

6. A method according to claim 5, wherein said polymerizable monomer is an unsaturated carboxylic acid.

7. A method for waterproofing an optical or electric cable, which comprises:

immobilizing on a fibrous substance a cross-linked macromolecular compound containing a sulfonic acid group or a salt thereof in an amount of not less than 0.5 mg. equivalent/g. and a dissociating group in an amount of not less than 1.0 gm. equivalent/g. and having the ability to absorb deionized water in the range of 50 to 1000 times its own weight, and packing the resultant immobilized compound in the sheath of said cable.

8. A method according to claim 7, wherein said fibrous substance comprises synthetic fibers, natural fibers, regenerated fibers, or inorganic fibers.

9. A method according to claim 7, wherein said cross-linked macromolecular compound is produced by polymerizing a monomer mixture consisting essentially of (A) 5 to 100 mol% of at least one sulfuric acid group unsaturated monomer selected from the group consisting of sulfoethyl(meth)acrylate, sulfopropyl(meth)acrylate, and 2-acrylamide-2-methylpropanesulfonic acid or salt thereof and (B) 95 to 0 mol% of at least one other unsaturated monomer selected from the group consisting of methacrylic acid, sodium methacrylate, acrylamide, acrylic acid, calcium acrylate, methacrylamide, methoxypolyethylene glycol monomethacrylate and sodium acrylate in the presence of a cross-linking agent in the range of 0.00001 to about 0.3 in molar ratio, based on said monomer mixture.

10. A method according to claim 2, wherein said film or sheet comprises paper, woven fabric, non-woven fabric, sheet of plastic substances or foil of metals.

11. A method according to claim 2, wherein said organic polymer type binder comprises polyurethane, polyester, polyamide, ethylene-vinyl acetate copolymer, acrylic acid (co)polymer, polyvinyl alcohol, hydroxyethyl cellulose, carboxymethyl cellulose, or polyacrylic ester.

* * * * *